(12) United States Patent
Linzer et al.

(10) Patent No.: US 7,420,616 B2
(45) Date of Patent: Sep. 2, 2008

(54) VIDEO ENCODER WITH REPEAT FIELD TO REPEAT FRAME CONVERSION

(75) Inventors: Elliot N. Linzer, Suffern, NY (US); Aaron G. Wells, Piedmont, CA (US)

(73) Assignee: LSI Corporation, Milpitas, CA (US)

( * ) Notice: Subject to any disclaimer, the term of this patent is extended or adjusted under 35 U.S.C. 154(b) by 689 days.

(21) Appl. No.: 11/006,479

(22) Filed: Dec. 7, 2004

(65) Prior Publication Data

US 2008/0007613 A1 Jan. 10, 2008

(51) Int. Cl.
*H04N 7/01* (2006.01)
(52) U.S. Cl. .................................. 348/441; 348/448
(58) Field of Classification Search ............... 348/441, 348/448, 458, 459; *H04N 7/01, 11/20*
See application file for complete search history.

(56) References Cited

U.S. PATENT DOCUMENTS

| 5,619,501 | A | 4/1997 | Tamer |
| 6,091,772 | A | 7/2000 | Anderson et al. |
| 6,236,806 | B1 * | 5/2001 | Kojima et al. ............... 348/441 |
| 6,317,463 | B1 | 11/2001 | Prozorov |
| 6,604,243 | B1 | 8/2003 | Freimann |
| 7,075,581 | B1 * | 7/2006 | Ozgen et al. ................ 348/448 |

* cited by examiner

*Primary Examiner*—Sherrie Hsia
(74) *Attorney, Agent, or Firm*—Christopher P. Maiorana, PC

(57) ABSTRACT

A method for encoding video, comprising the steps of (A) detecting repeated fields in a video sequence and (B) generating a first repeated frame from a top field and any adjacent bottom field based upon detection of the repeated fields, wherein the top field and the bottom field are from one film frame.

35 Claims, 7 Drawing Sheets

EFFECTIVE TEMPORAL PLACEMENT OF OUTPUT CIF FRAMES WHEN THERE IS FAST MOTION

VIDEO ENCODER WITH REPEAT FIELD TO REPEAT FRAME CONVERSION

FIELD OF THE INVENTION

The present invention relates to film to video conversion generally and, more particularly, to a video encoder with repeat field to repeat frame conversion.

BACKGROUND OF THE INVENTION

Pre-recorded and recordable DVDs use MPEG-2 compression. Due to the limited storage capacity on a disk, it is desirable to obtain as efficient a compression ratio as possible at a given quality level. Increasing the compression ratio allows a single disk to store more video and/or store video at a higher quality level.

It would be desirable to implement a method and/or apparatus for converting a video sequence containing repeated fields into a video sequence with repeated frames prior to compressing the video.

SUMMARY OF THE INVENTION

The present invention concerns a method for encoding video, comprising the steps of (A) detecting repeated fields in a video sequence and (B) generating a first repeated frame from a top field and any adjacent bottom field based upon detection of the repeated fields, wherein the top field and the bottom field are from one film frame.

The objects, features and advantages of the present invention include providing a method and/or apparatus for encoding video with repeat field to repeat frame conversion that may (i) encode all common intermediate format (CIF) encoded frames from both fields of a film frame, (ii) have better vertical resolution than conventional solutions, (iii) reduce jerkiness of displayed CIF encoded sequence, (iv) for full height encoding, generate all encoded frames from one film frame for easier compression, and/or (v) use fewer bits for a given quality.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
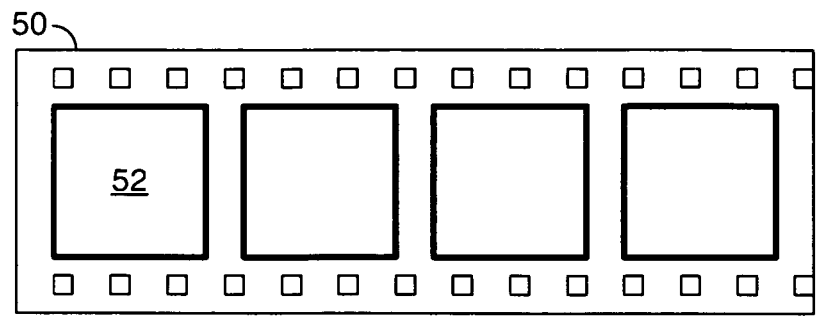
FIG. 1 is a block diagram illustrating a number of film frames.

Referring to FIG. 1, a block diagram of a 35 mm film negative 50 is shown illustrating a number of film frames 52. Movies are usually made on 35 mm film. The 35 mm film format presents images (frames) at a rate of 24 frames per second (fps). The frames 52 are the smallest picture unit of the 35 mm film format.

Movies in the 35 mm film format may be converted to video format for distribution (e.g., on DVDs). One video format used is NTSC interlaced video. Interlaced video is a field-based format that presents images (or pictures) at a rate of approximately 60 fields per second. A field is the smallest picture unit in the interlaced video format. A video frame is made up of two video fields. Thus, the interlaced video format has a frame rate of approximately 30 frames per second (fps).

Figure 2:
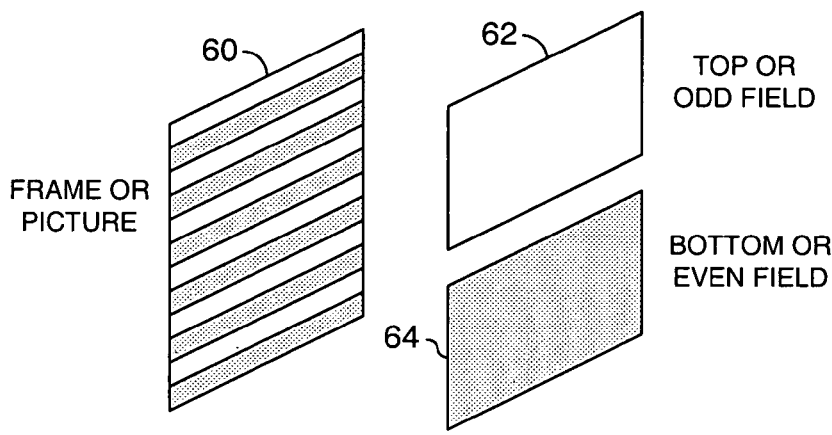
FIG. 2 is a block diagram illustrating an interlaced video frame.

Referring to FIG. 2, a diagram illustrating an interlaced video frame 60 is shown. Each interlaced video image (or picture) 60 includes of a top (or odd) field 62 and a bottom (or even) field 64. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2).

A field picture contains data from a single video field. For example, for video which has a resolution of 720×480 luminance (luma or Y) samples/frame, a single field picture would encode 720×240 luma samples (and 360×120 each for blue chrominance (Cb) and red chrominance (Cr) samples for 4:2:0 compression). The field picture may be divided into groups of samples called macroblocks. In one example, each macroblock may contain 16×16 luma samples and 8×8 chroma samples for each of Cb and Cr from the field. The MPEG-2 specification specifies that field pictures be coded in pairs (i.e., a top field and a bottom field with the same temporal reference or frame number).

A frame picture contains data from each of the two video fields. For example, for video which has a resolution of 720×480 luminance samples/frame, a single frame picture would encode 720×240 luma samples and 360×120 samples for each of Cb and Cr (for 4:2:0 compression) from each field. Since a frame is two fields, 720×480 luma samples and 360×240 each of Cb and Cr samples (for 4:2:0 compression) would be encoded overall. The frame picture may be divided into groups of samples called macroblocks. In one example, each macroblock may contain 16×16 luma samples and 8×8 chroma samples for each of Cb and Cr from the frame, or 16×8 luma and 8×4 for each of Cb and Cr from each field.

To match the frame (or picture) rates between 35 mm film format and NTSC interlaced video format, a conversion from the film format to the NTSC video format may be performed using a process referred to as telecine or 3:2 pulldown. The telecine conversion process involves expanding the 24 frames in the 35 mm film format by six frames to obtain the 30 frame per second NTSC video format.

The six frames that are added (or repeated) are determined based on a standardization of the telecine conversion. Since a video frame consists of two fields, the film format may be converted into fields first so that the smallest unit of both the film format and the video format are the same. Thus, the 35 mm film format becomes 48 fields. The field-based film material is then telecined into the NTSC video format.

Figure 3:
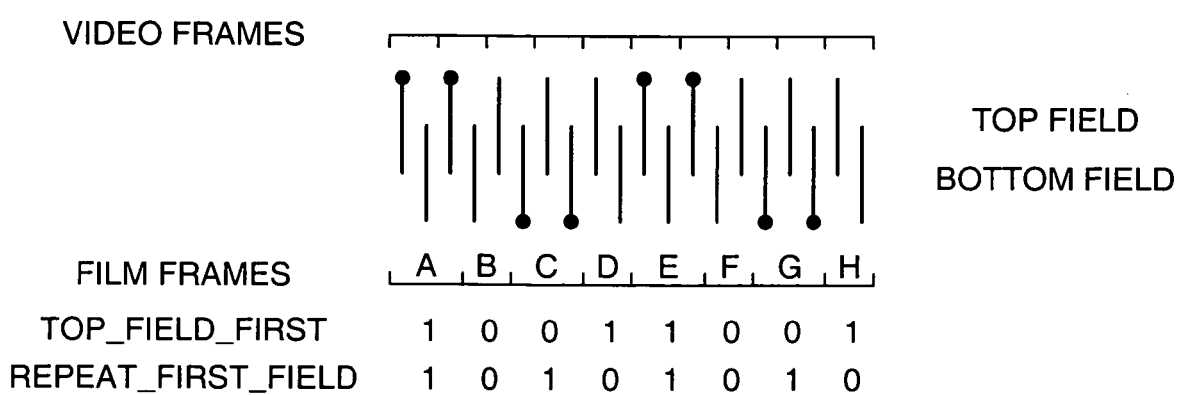
FIG. 3 is a diagram illustrating a telecine conversion scheme.

Referring to FIG. 3, a diagram illustrating a telecine conversion scheme is shown. The telecine process involves repeating a first field of a film frame in a 2:3 sequence (repeated fields are indicated in FIG. 3 by a filled circle). Specifically, for film frames labeled A, B, C, D, E, F, G and H, the sequence of video fields may be described with reference to the film frames as follows: A top, A bottom, A top, B bottom, B top, C bottom, C top, C bottom, D top, D bottom, etc. Since one video frame consists of two video fields, the sequence of fields for the video frames becomes A top, A bottom; A top, B bottom; B top, C bottom; C top, C bottom; D top, D bottom; etc. The conversion from four solid film frames 52 into five video frames 60 includes three solid frames (e.g., top and bottom fields from the same film frame) and two composite frames (e.g., top and bottom fields from different film frames).

In an MPEG-2 video, storing the frames for one second of a 30 fps video sequence creates a much bigger file than storing the 24 frames for one second of a 24 fps movie sequence. For example, one second at 24 frames per second is 20 percent smaller in size than one second at 30 frames per second. The MPEG-2 specification includes two flags (e.g., repeat_first_field and top_field_first) that allow saving a movie in the 30 fps video format in the original 24 fps size.

The two flags top_field_first and repeat_first_field may be used to control how a frame picture is displayed. When the flag top_field_first is set (e.g., a logic HIGH or 1), the top field of the picture is displayed before the bottom field. When the flag top_field_first is not set (e.g., a logic LOW or 0), the bottom field is displayed first. When the flag repeat_first_field is set (e.g., a logic HIGH or 1), the first field, which can be a top field or a bottom field based on the flag top_field_first being set or not set, is displayed both before the second field and after the second field.

The flag repeat_first_field is usually used to encode mixed 24 frame per second (fps) film and 30 fps video material. Typically, when 24 fps film is converted to video, the first field of every other film frame is repeated. Thus two film frames, which occupy $2/24=1/12$th of a second, are displayed as five video fields, which also occupy $5/60=1/12$th of a second.

Conventional video encoders can detect the repeated fields. When a repeated field is detected, the repeated field is generally not compressed or transmitted. Instead, the flag repeat_first_field is set to one in the previous frame (in display order). The value of the flag top_field_first then changes in the next frame. The MPEG-2 specification specifies that the flag top_field_first change when and only when the flag repeat_first_field=1.

However, using the flag repeat_first_field with recordable media (e.g., in DVD recorders, hard drive recorders such as personal video recorders (PVRs) and personal computers (PCs), etc.) has disadvantages. The DVD standard specifies that groups of pictures (GOPs) begin as top field first. Ensuring that the next GOP will start top field first is difficult when the flag repeat_first_field is set. Other inexpensive editing tools (e.g., for use on PCs) do not like the flag repeat_first_field because data streams need to be parsed and accurate editing can be frustrated. Conventional recordable DVD video editors cannot handle a splice from the flag top_field_first=0 to the flag top_field_first=1 or from the flag top_field_first=1 to the flag top_field_first=0. Conventional recorders always set the flag top_field_first to 1.

In practice, conventional video encoders used with DVD recorders, hard drive recorders, etc., neither detect repeated fields nor set the flag top_field_first=0 in encoded video. The lack of either (i) detection of repeated fields or (ii) use of the flag top_field_first in the encoded video reduces video quality in two ways. First, more data needs to be represented in the compressed stream because 30 frames, instead of 24, are compressed every second. Therefore, for a given overall bit rate the number of bits/frame must be lower because repeated fields are compressed instead of setting the flag repeat_first_field. Second, some compressed frames contain data from two film frames. When compressed frames contain data from two film frames, the two fields of the compressed frame can be very different from one another when there is fast motion. Fields that are very different from one another can result in poor compression.

Conventional DVD recorders operating in "extended play" mode (typically 6-8 hours per DVD) first reduce the resolution of the incoming video stream to common intermediate format (CIF) resolution (352×240×30 frames/second). The reduced resolution stream is then encoded. The encoded reduced resolution video cannot be as sharp as video encoded at the full resolution. However, the overall decoded quality may be better because more bits per encoded macroblock may be used.

A conventional encoder generally converts a Comite' Consultatif International des Radio Communications (CCIR) sequence (e.g., 720×240×60 interlaced) to a CIF sequence. Linear filters are generally used to reduced the horizontal resolution to 352. Every top (or odd) field is generally combined with the bottom (or even) field that follows (240 lines each) to produce one frame that is 240 lines high. Typically, a non-linear process is used that (i) averages both fields when there is little motion, (ii) takes the top field when there is a significant amount of motion, and (iii) makes a compromise (e.g., takes more top field than bottom field) when there is moderate motion. The process is generally referred to as de-interlacing and decimating.

Figure 4:
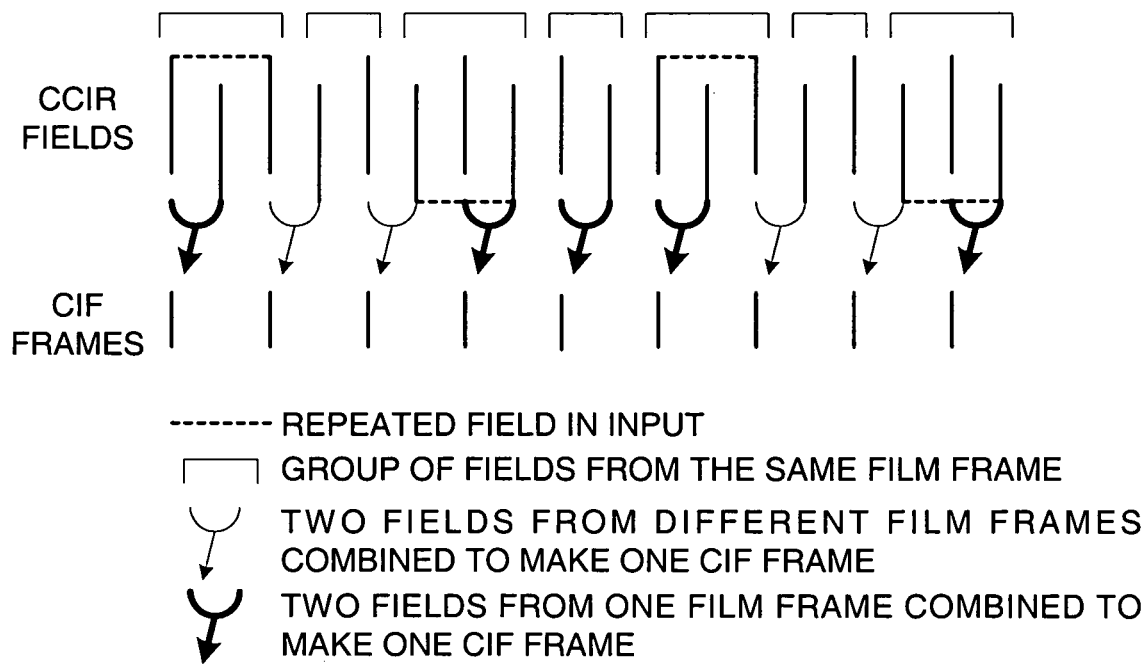
FIG. 4 is a diagram illustrating conversion of CCIR fields to CIF frames.

Referring to FIG. 4, a diagram illustrating a conversion from CCIR fields to CIF frames is shown. When converting 60 Hz interlaced material that has repeated fields (e.g., material that is really 24 Hz progressive) directly to 30 Hz CIF there are some problems that can lead to a degradation of video quality. Specifically, a periodic pattern of sometimes taking as input to the conversion process fields from different film frames, and sometimes taking fields from the same film frame may occur. Because the visual impact of de-interlacing and decimating can be different for a CIF frame that is formed from one video field versus a CIF frame that is formed from two video fields, a visible periodic pattern may exist.

Figure 5:
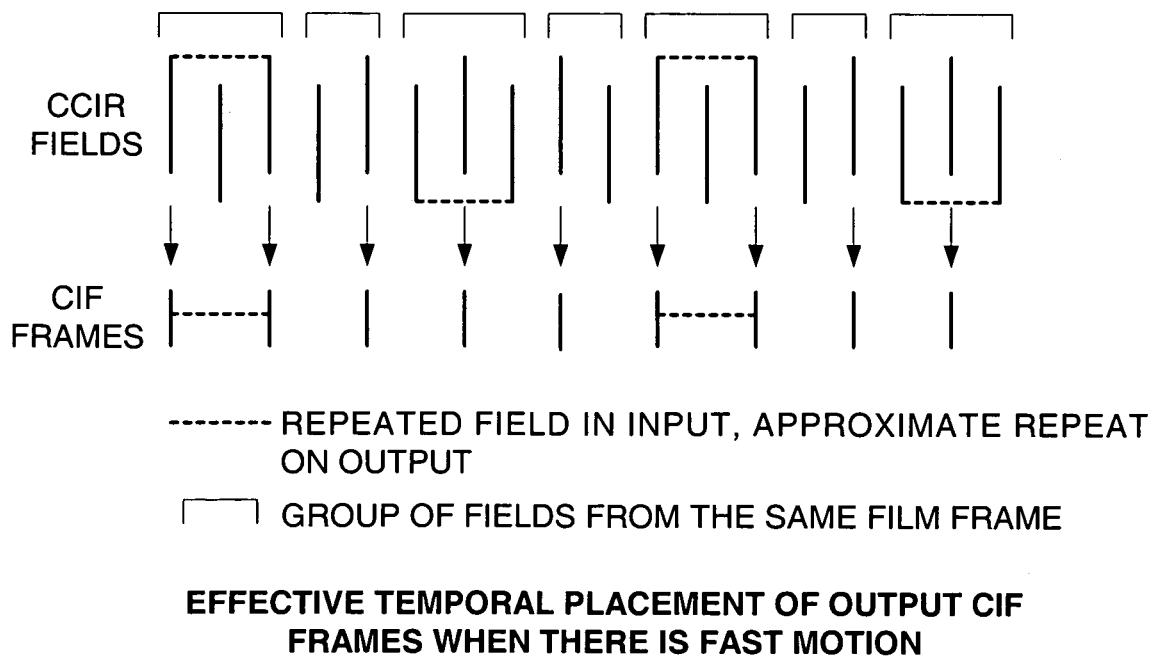
FIG. 5 is a diagram illustrating effective temporal placement of output CIF frames where fast motion is present.

Referring to FIG. 5, a diagram is shown illustrating effective temporal placement of output CIF frames when fast motion is present. For fast moving video, the CIF frames that are formed from two film frames mainly use the top field (e.g., indicated by arrows from field to frame). Two problems can arise: (i) the frames are based on only 240 lines, and, therefore, are of lower visual quality then frames based on 480 lines and (ii) every fifth CIF frame is a near repeat of the previous fifth frame (e.g., indicated by a dashed line between frames). Repeating every fifth frame creates a jerky output. Specifically, the effect of repeating a frame (duration=$1/30^{th}$ of a second) is more noticeable then repeating a field (duration=$1/60^{th}$ of a second).

Figure 6:
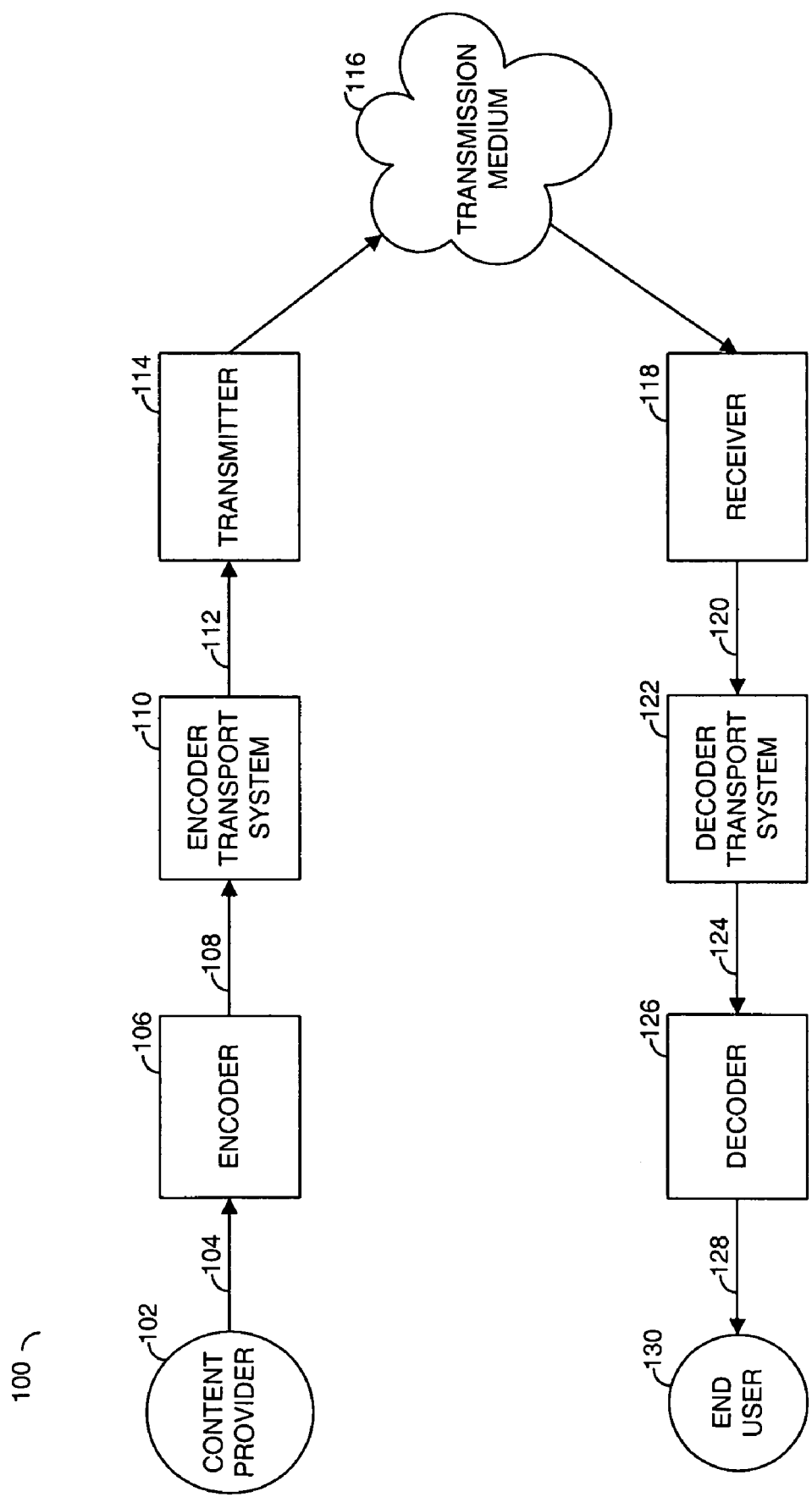
FIG. 6 is a block diagram illustrating various components of a compressed video system in accordance with a preferred embodiment of the present invention.

Referring to FIG. 6, a block diagram of a system 100 in accordance with a preferred embodiment of the present invention is shown. In general, a content provider 102 presents video image, audio or other data 104 to be compressed and transmitted to an input of an encoder 106. In one example, the video image data may comprise material converted (e.g. telecined) from film format. The encoder 106 may be configured to generate a compressed bit stream 108 in response to the input stream 104. In one example, the encoder 106 may be configured to encode data using a process in accordance with a preferred embodiment of the present invention (described in more detail below in connection FIGS. 9 and 11). The compressed data 108 from the encoder 106 may be presented to an encoder transport system 110. An output of the encoder transport system 110 generally presents a signal 112 to a transmitter 114. The transmitter 114 transmits the compressed data via a transmission medium 116. The content provider 102 may comprise a video broadcast, DVD, or any other source of video data stream. The transmission medium 116 may comprise a broadcast, cable, satellite, network, DVD, hard drive, or any other medium implemented to carry, transfer, and/or store a compressed bit stream.

On a receiving side of the system 100, a receiver 118 generally receives the compressed data bit stream from the transmission medium 116. The receiver 118 presents an encoded bit stream 120 to a decoder transport system 122. The decoder transport system 122 generally presents the encoded bit stream via a link 124 to a decoder 126. The decoder 126 generally decompresses (decodes) the data bit stream and presents the data via a link 128 to an end user 130. The decoder 126 may be configured to store a number of decoded frames and determine whether repeated frames are present (e.g., based on frame comparison and/or information in the bit stream). The decoder 126 may be configured to convert repeated frames to repeated fields in accordance with a preferred embodiment of the present invention (described in more detail below in connection with FIGS. 10 and 12). The end user 130 may comprise a television, a monitor, a computer, a projector, a hard drive, or any other medium implemented to carry, transfer, present, display and/or store the uncompressed bit stream (decoded video signal).

Figure 7:
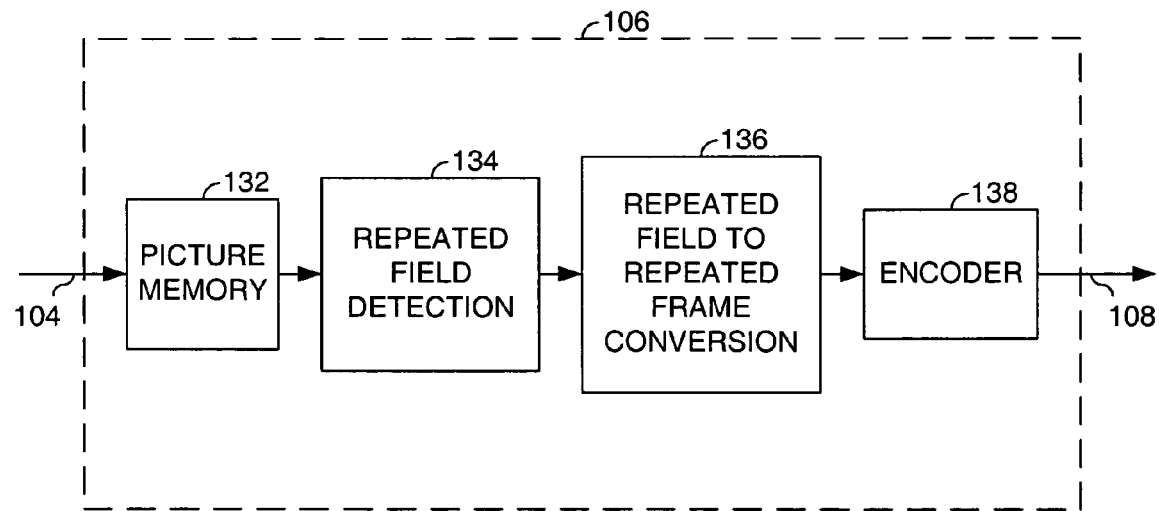
FIG. 7 is a more detailed block diagram illustrating an example encoder in accordance with a preferred embodiment of the present invention.

Referring to FIG. 7, a more detailed block diagram is shown illustrating an example implementation of the encoder 106 in FIG. 6. In one example, the encoder 106 may comprise a block (or circuit) 132, a block (or circuit) 134, a block (or circuit) 136 and a block (or circuit) 138. The block 132 may be implemented as a picture memory. The block 134 may be implemented, in one example, as a repeated field detector. The block 136 may be configured to perform a repeated field to repeated frame conversion (e.g., using the techniques described below in connection with FIGS. 9 and 11). Fields from the input stream 104 may be stored in the block 132. The block 134 may be configured to examine the stored fields to detect repeats. The block 134 may be further configured to communicate detection of repeated fields to the block 136. The block 136 may be configured to convert the repeated fields to repeated frames. The block 136 may be further configured to communicate information about the repeated frames to the block 138. The block 138 may be configured to encode the video sequence including any repeated frames and present the encoded video sequence in the bit stream 108. The block 138 may be further configured to embed or tunnel information about the repeated frames in the bit stream 108.

Figure 8:
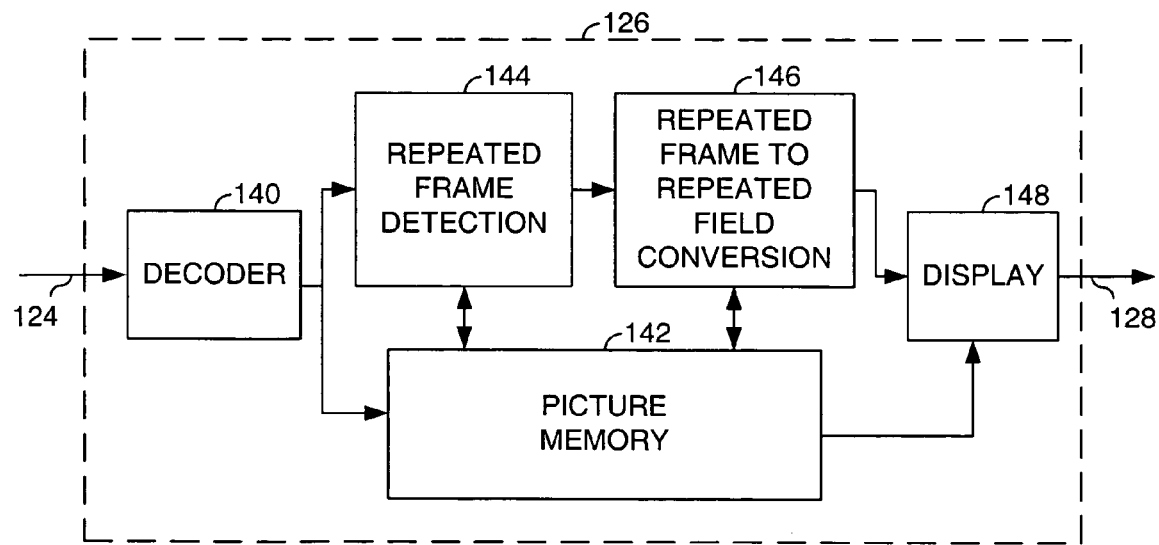
FIG. 8 is a more detailed block diagram illustrating an example decoder in accordance with a preferred embodiment of the present invention.

Referring to FIG. 8, a more detailed block diagram is shown illustrating an example implementation of the decoder 126 in FIG. 6. In one example, the decoder 126 may comprise a block (or circuit) 140, a block (or circuit) 142, a block (or circuit) 144, a block (or circuit) 146 and a block (or circuit) 148. The block 140 may be implemented, in one example, as a decoder. The block 142 may be implemented, in one example, as a picture memory. The block 144 may be implemented, in one example, as a repeated frame detector. The block 146 may be configured to perform a repeated frame to repeated field conversion (e.g., using the techniques described below in connection with FIGS. 10 and 12). Frames from the bit stream 124 may be decoded and stored in the block 142. The block 144 may be configured to examine the stored frames to detect repeats. The block 144 may be further configured to receive embedded or tunneled information about the repeated frames from the bit stream 124. The block 144 may be further configured to communicate detection of repeated frames to the block 146. The block 146 may be configured to convert the repeated frames to repeated fields. The block 146 may be further configured to communicate information about the repeated fields to the block 148. The block 148 may be configured to display the video sequence including any repeated fields and/or present the decoded video sequence via the link 128.

The encoder 106 and the decoder 126 may be implemented in hardware, software (or firmware) or a combination of hardware and software. Although the encoder 106 and the decoder 108 have been illustrated with particular arrangements of elements, other appropriate arrangements of components may be implemented accordingly to meet the design criteria of a particular implementation, as will be readily apparent to those skilled in the art(s). The present invention may be implemented by the preparation of ASICs, FPGAs, or by interconnecting an appropriate network of conventional component circuits according to the teachings of the present specification, as will be readily apparent to those skilled in the art(s). Appropriate software coding can readily be prepared by skilled programmers based on the teachings of the present disclosure, as will also be apparent to those skilled in the relevant art(s).

Figure 9:
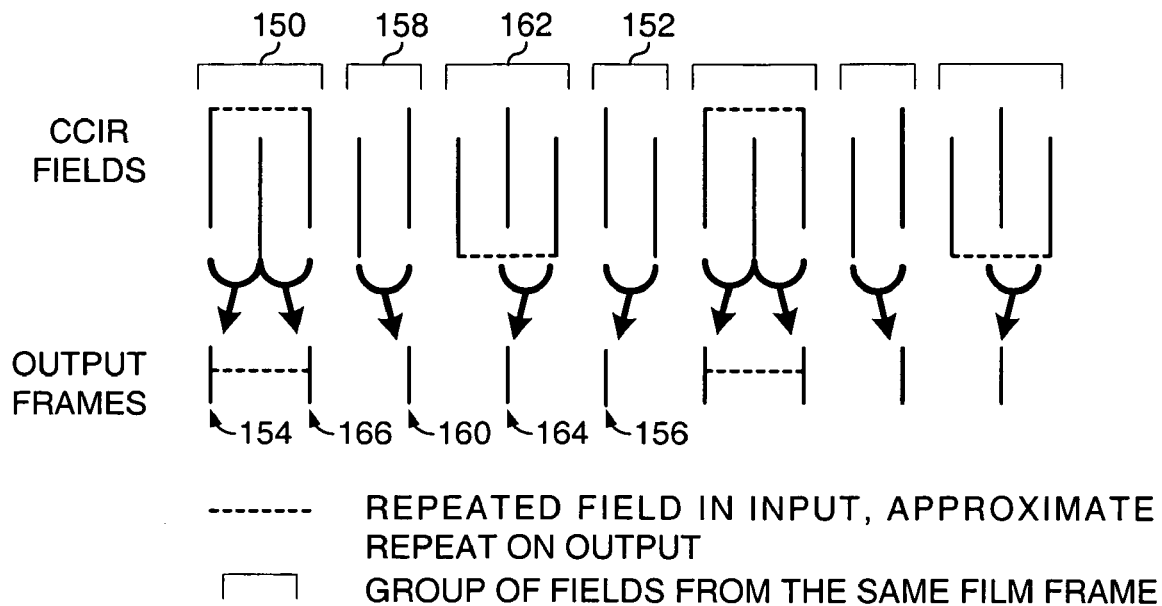
FIG. 9 is a diagram illustrating a conversion process in accordance with a preferred embodiment of the present invention.

Referring to FIG. 9, a diagram is shown illustrating a CIF encoding process in accordance with a preferred embodiment of the present invention. Every output frame is generally formed by combining two fields from the same film frame. Specifically, for every output frame an encoder in accordance with a preferred embodiment of the present invention may be configured to perform the following: When a film pattern (or telecine) is not detected, make the output frame from the corresponding input top field and the subsequent bottom field. When a film pattern is detected, make the output frame from a top field and any adjacent bottom field from the same film frame as the input top field that corresponds in time to the output frame.

In one example, the following rules may be implemented. The input top field used is the top field that corresponds in time with the output frame. When the input top field is the first field of either a two field input film frame (e.g., the film frame 150) or a three field input film frame (e.g., the film frame 152), the input bottom field is the second field of the input film frame (e.g., the output frames 154 and 156). When the input top field is the second field of a two field input film frame (e.g., the film frame 158), the input bottom field is the first field of the input film frame (e.g., the output frame 160). When the input top field is the second field of a three field input film frame (e.g., the film frame 162), the input bottom field is the third field of the input film frame (e.g., the output frame 164). When the input top field is the third field of a three field input film frame (e.g., the film frame 150), the input bottom field is the second field of the input film frame (e.g., the output frame 166). The encoded sequence may have repeated frames (e.g., the output frames 154 and 166).

In general, three methods may be implemented for generating the repeated frames. The first method may use the specific rules presented above so that, in some cases when an input film frame has three fields (e.g., the film frame 150), one output frame is made up of the first two fields and another output frame is made up of the last two fields (e.g., the output frames 154 and 166). Since the third field of the input film frame is the same as the first field of the input film frame, the two output frames 154 and 166 are substantially identical. The second method may be to simply encode the same output frame twice. The third method may be implemented when one of the two frames that are repeats of one another can be predicted from one another in the bit stream. The third method may comprise using a compressed representation of one of the frames that indicates the frame is a repeat (e.g., a frame encoded with all zero motion vectors with no residual).

More generally, the present invention may be implemented when the encoded resolution is different from (e.g., less than) the input resolution (e.g., as described above in the example of 480 lines (CCIR) in and 240 lines (CIF) out) or when the encoded resolution is at the same vertical resolution as the input (e.g., 480 lines in, 480 lines out).

A second aspect of the present invention concerns how frames are de-interlaced and decimated when the output resolution is different from the input resolution. In one example, the following approach may be implemented. When a film (telecine) pattern is not detected, frames may be de-interlaced by combining both input fields using conventional methods (e.g., adaptively favoring the top field (motion) or using both (no motion)). When a film (telecine) pattern is detected, the two fields may be woven together. For example, a linear filter may be implemented that combines the two fields in such a way that both make substantially the same contribution to the output without regard to motion. The second aspect generally ensures that the output frames may have an effective vertical resolution.

Figure 10:
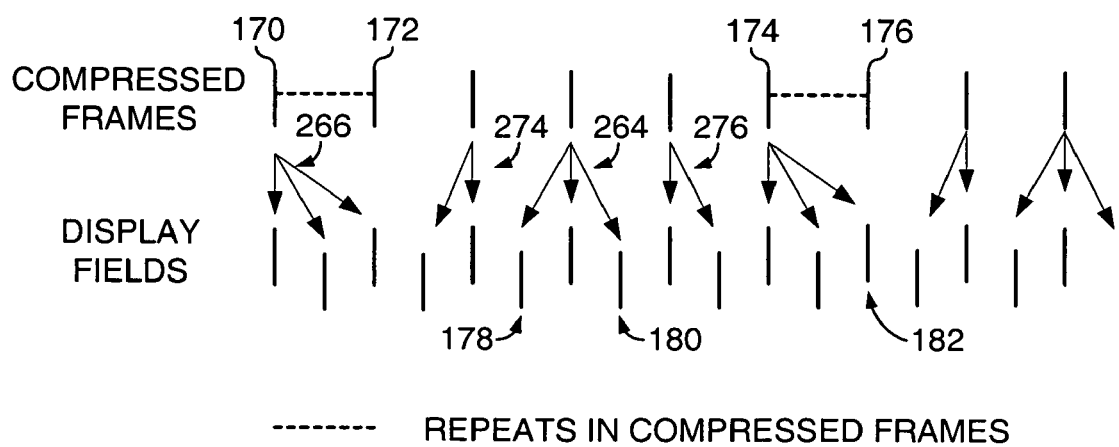
FIG. 10 is a diagram illustrating a playback process in accordance with the present invention.

Referring to FIG. 10, a diagram illustrating a playback process in accordance with a preferred embodiment of the present invention is shown. A video sequence, for example, that has been processed (or encoded) in accordance with the present invention, may have every fifth frame repeated when played back (e.g., the compressed frames 170 and 172, etc.). Repeating every fifth frame generally results in jerkier motion than repeating every fifth field. However, a conventional (or legacy) decoder is generally able to play back the encoded video (e.g., from an optical disk or other medium) with acceptable video quality. In another aspect of the present invention, a decoder may be configured to play back the encoded (compressed) video with better, less jerky, quality. Specifically, the present invention generally provides a process for displaying a video sequence comprising the steps of: (i) determining whether a video stream contains periodic frame repeats and if so, determining which frames are repeats, (ii) displaying the sequence with repeat fields by sometimes repeating fields in frames that are not repeats (e.g., the fields 178 and 180), and sometimes displaying only one field from a frame that is a repeat (e.g., the field 182).

Figure 11:
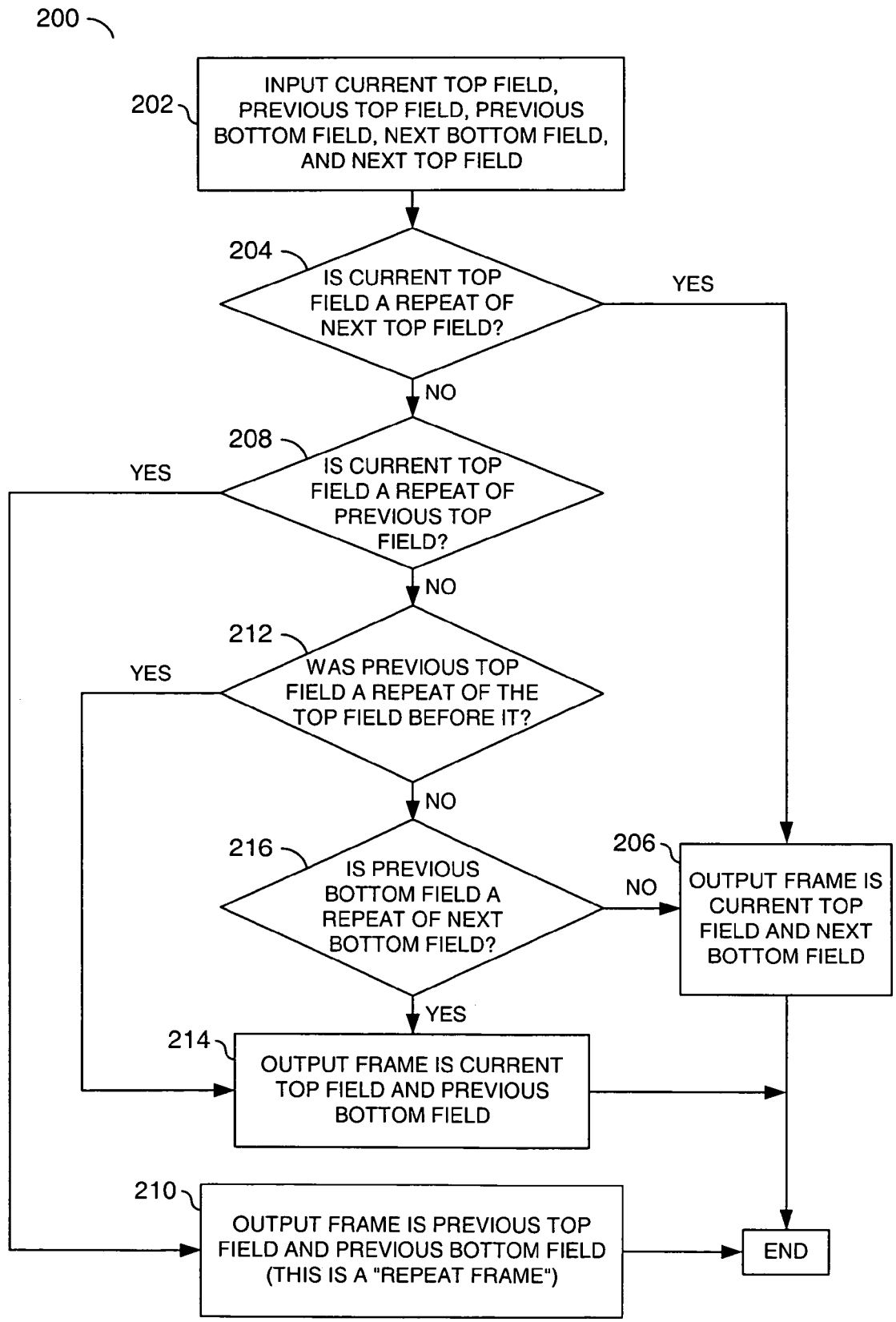
FIG. 11 is a flow diagram illustrating an encoding process in accordance with the present invention.

Referring to FIG. 11, a flow diagram 200 is shown illustrating an example encoder operation in accordance with a preferred embodiment of the present invention. In a first step, a current top field, a previous top field, a previous bottom field, a next bottom field and a next top field may be input, for example, into a picture memory of the encoder (e.g., the block 202). The current top field and next top field may be examined (e.g., compared) to determine whether the current top field is a repeat of the next top field. When the current top field is a repeat of the next top field, the encoder generally outputs a frame comprising the current top field and the next bottom field (e.g., the block 206) and ends the process with respect to the current top field.

When the current top field is not a repeat of the next top field, the current top field and the previous top field may be examined to determine whether the current top field is a repeat of the previous top field (e.g., the block 208). When the current top field is a repeat of the previous top field, the output frame may be generated comprising the previous top field and the previous bottom field (e.g., the block 210). The output frame of the block 210 generally comprises a repeat frame.

When the current top field is not a repeat of the previous top field, the previous top field and a next previous top field may be examined to determine whether the previous top field is a repeat of the next previous top field (e.g., the block 212). When the previous top field is a repeat of the next previous top field, the output frame is generally generated comprising the current top field and the previous bottom field (e.g., the block 214).

When the previous top field is not a repeat of the next previous top field, the previous bottom field and the next bottom field may be examined to determine whether the previous bottom field is a repeat of the next bottom field (e.g., the block 216). When the previous bottom field is a repeat of the next bottom field, the output frame is generally generated comprising the current top field and the previous bottom field (e.g., the block 214). When the previous bottom field is not a repeat of the next bottom field, the output frame is generally generated comprising the current top field and the next bottom-field (e.g., the block 206). The process 200 is generally repeated for each top field of the video sequence.

Figure 12:
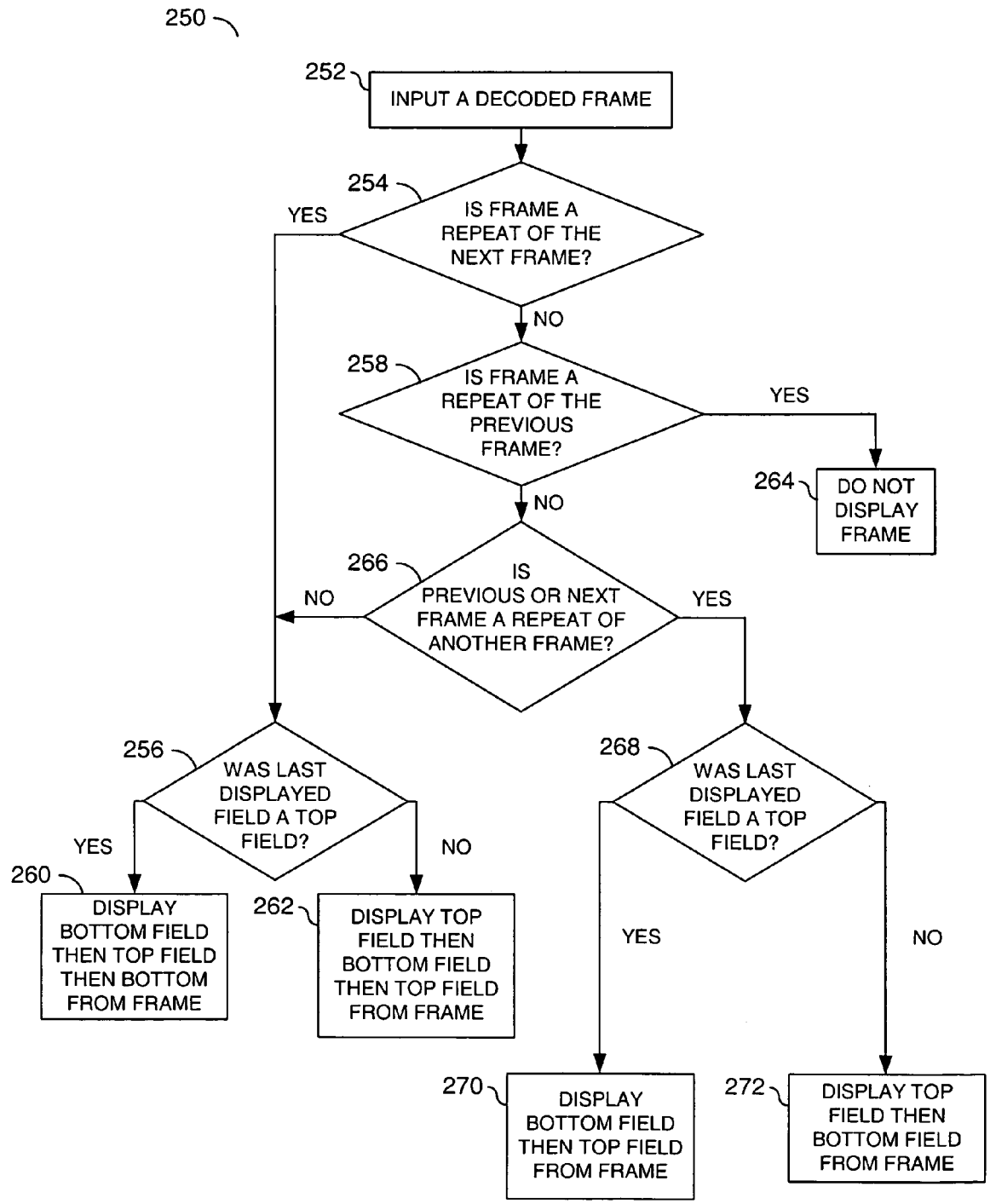
FIG. 12 is a flow diagram illustrating a decoding process in accordance with the present invention.

Referring to FIG. 12 a flow diagram of a process 250 is shown illustrating a decoder operation in accordance with a preferred embodiment of the present invention. The process 250 may comprise a number of states (or blocks) 252-272. The process 250 is generally applied to each decoded frame. In one example, a number of decoded frames may be stored in a frame buffer of the decoder for processing in accordance with the present invention. The process 250 generally begins by inputting a current decoded frame (e.g., the block 252). The current frame is generally examined to determine whether the current frame is a repeat of a next frame (e.g., the block 254). When the current frame is a repeat of the next frame, the process 250 generally moves to the state 256. When the current frame is not a repeat of the next frame, the process 250 generally moves to the state 258.

In the state 256, the process 250 generally determines whether a last displayed field was a top field. When the last displayed field was a top field, the bottom field from the current frame is displayed, then the top field from the current frame is displayed, then the bottom field from the current frame is displayed again (e.g., the block 260). When the last displayed field was not a top field, the process 250 generally displays the top field from the current frame, then the bottom field from the current frame, then the top field again from the current frame (e.g., the block 262). Examples of the steps 260 and 262 are illustrated by the arrows 264 and 266, respectively, in FIG. 10.

When the process 250 is in the state 258, the current frame is generally examined to determine whether the current frame is a repeat of the previous frame. When the current frame is a repeat of the previous frame, the current frame is generally not displayed (e.g., the block 264). For example, referring to FIG. 10, because the frame 172 is a repeat of the frame 170, the frame 172 is not displayed. When the current frame is not a repeat of the previous frame, the process 250 moves to the state 266. In the state 266, the previous frame and the next frame are generally examined to determine whether either (i) the previous frame is a repeat of the frame before the previous frame or (ii) the next frame is a repeat of the frame following the next frame (e.g., the block 266). When the previous frame and the next frame are determined not to be repeats, the process 250 generally moves to the state 256. When either the previous frame or the next frame is a repeat of another frame, the process 250 generally moves to the state 268.

In the state 268, the process 250 generally examines the last displayed field to determine whether or not the last displayed field was a top field. When the last displayed field was a top field, the bottom field of the current frame is displayed and then the top field (e.g., the block 270). When the last displayed field was not a top field, the process 250 generally displays the top field of the current frame and then the bottom field of the current frame (e.g., the block 272). Examples of the steps 270 and 272 are illustrated by the arrows 274 and 276, respectively, in FIG. 10. The process 250 is generally repeated for each decoded frame.

In one example, the decoder may be configured to determine a position of the repeated frames in the original stream. For example, the decoder may be configured to determine where the repeat frames are located by measuring differences between frames to detect when frames are repeats (e.g., decoded pixel comparison). In another example, the decoder may be configured to detect dummy picture encoding. Methods for detecting repeat frames may be implemented that are similar to conventional methods for repeat field detection.

For example, a score may be computed for each frame that is a measure of the difference between a current frame and the frame that comes before or after the current frame. In one embodiment, scores may be determined by generating a sum of the absolute differences (SADs) between each sample in the current frame and a co-located sample in the other frame. In another embodiment, scores may be determined by dividing the frame into rectangles of samples and generating a score for each rectangle. For example, the scores may be generated as the sum of the absolute differences between each sample in the rectangle from the current frame and co-located samples in the other frame. The score for the frame may be determined, in one example, as the maximum score for a rectangle.

Whether a frame is a repeat or not may be determined based on the scores using one of the following example processes. When (i) the current score is less than a first predetermined constant (e.g., C0) and (ii) the current score is less than a second predetermined constant (e.g., C1) multiplied by a value determined based upon a number of frames (e.g., the minimum score for the last 4 frames), the frame may be considered a repeat. Otherwise the frame is generally not considered a repeat. In one example, the constant C0 may equal 1000 and the constant C1 may equal one-half.

In another example, when the current score is less than the value of the constant C0 and the current score is less than the value C1×min (score for last 4 frames), the frame may be considered a possible repeat. Otherwise, the frame is not considered a repeat. When the current frame is considered a possible repeat and the frame five frames before the current frame is considered a possible repeat, the current frame is considered to be a repeat. Otherwise, the current frame is not considered to be a repeat.

In another embodiment, the decoder generally does not process decoded frames to determine which frames are repeats. Instead, the decoder may be configured to detect and/or receive a signal from the encoder indicating which frames are repeats. In one example, the information concerning repeated frames may be communicated by the encoder using a tunneling method as described in a co-pending application U.S. Ser. No. 10/939,786, filed Sep. 13, 2004, which is hereby incorporated by reference in its entirety. In another example, the information concerning repeated frames may be embedded in user data areas within the bit stream. However, embedding the information in user areas should be performed carefully since using the user data structures may conflict with other uses of the data area or confuse decoders not configured to anticipate the presence of such user data.

In many cases, it is desirable for an encoder to store or transmit a stream that (i) may be played back by a conventional (legacy) decoder without (by definition) any special processing to make the display less jerky and (ii) may be played back by an "aware" decoder in a way that reduces jerkiness. An example would be a DVD recorder. It is desirable that all disks recorded by the recorder may be playable in all DVD recorders and players. Improving the disk to provide better playback in "aware" players, such as the recorder, potentially adds to the enjoyment of the playback, while maintaining compatibility with existing players. Signaling the repeated frames in a way that will not cause a non-aware decoder any problems maintains such compatibility.

In one example, the encoder may be configured to generate an elementary bit stream in such a way that syntax elements whose meaning has nothing to do with repeated frames may be used to signal repeated frames. The use of syntax elements to signal repeated frames is possible because the process for encoding frames is non-normative. In other words, an encoder has many options in the encoding details of the stream sent. For example, in many compression formats (e.g., MPEG-1, MPEG-2, MPEG-4, H.264, VC-9, VC-1, etc.) headers are byte aligned.

In one example, an encoder may be configured to insert additional bytes of zeros before headers. The number of zeros used before a particular header may be used to signal the repeat information. For example, no extra zeros may indicate the stream is not film material; 1 extra zero may indicate the stream is film material but the current picture is not a repeat; 2 extra zeros may indicate the stream is film material and the current picture is a repeat. In another example, the quantization value in a first macroblock in a picture may be used to signal the status. In yet another example, the difference between the first two quantization values in the picture may be used to signal the status. However, other signaling schemes may be implemented accordingly to meet the design criteria of a particular implementation.

In yet another aspect of the present invention, an encoder implemented in accordance with a preferred embodiment of the present invention may be configured to place reference frames in such a way that for each pair of repeated frames in a sequence at least one is a reference picture (e.g., an I-picture or P-picture). By ensuring that at least one frame of each pair of repeated frames is a reference picture, the other frame may be coded with very few bits. In one example, a process may be implemented such as the one described in co-pending application U.S. Ser. No. 10/984,243 (Attorney Docket No. 1496.00388), filed Nov. 9, 2004, which is hereby incorporated by reference in its entirety.

For CIF encoding, all encoded frames may come from both fields of a film frame and, therefore, have better vertical resolution. For CIF encoding, the sequence may be displayed with less jerkiness. For full height encoding, all encoded frames may come from one film frame and, therefore, be easier to compress (e.g., use fewer bits for the same quality).

The function performed by the flow diagrams of FIGS. 9 and 10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for encoding video, comprising the steps of:
(A) detecting a pair of repeated fields in a video sequence;
(B) when said pair of repeated fields comprises a first top field repeated as a second top field separated by an intervening bottom field, generating a pair of frames, wherein (i) a first frame of said pair is generated from said first top field and said intervening bottom field and (ii) a second frame of said pair is generated from said intervening bottom field and said second top field;
(C) when said pair of repeated fields comprises a first bottom field repeated as a second bottom field separated by an intervening top field, generating a single frame from said first bottom field and said intervening top field; and
(D) when a top field and an adjacent bottom field are not repeated fields, generating a single frame from said top field and said adjacent bottom field.

2. The method according to claim 1, wherein each of said frames is generated based upon a top field and a bottom field from the same film frame.

3. The method according to claim 1, wherein said second top field in said pair of repeated fields is a third field of a film frame and said intervening bottom field is a second field of said film frame.

4. The method according to claim 1, wherein said intervening top field is a second field of a film frame and said second bottom field of said pair of repeated fields is a third field of said film frame.

5. The method according to claim 1, wherein:
generating said pair of frames comprises generating a repeated frame.

6. The method according to claim 5, wherein said repeated frame is generated from the same film frame as the other frame of said pair of frames.

7. The method according to claim 5, wherein said repeated frame comprises a second progressive picture generated from a film frame.

8. The method according to claim 5, wherein said repeated frame is generated from a second field of a film frame and a third field of said film frame.

9. The method according to claim 5, wherein said repeated frame is added to a compressed bit stream by encoding said first frame of said pair of frames twice.

10. The method according to claim 5, wherein said repeated frame is added to a compressed bit stream using a compressed representation that copies said first frame of said pair of frames.

11. The method according to claim 5, wherein said repeated frame is identified as a repeat of said first frame of said pair of frames.

12. A video encoder apparatus comprising:
a first circuit configured to detect a pair of repeated fields in a video sequence; and
a second circuit configured to generate
(A) a pair of repeated frames when said pair of repeated fields comprises a first top field repeated as a second top field separated by an intervening bottom field, wherein (i) a first frame of said pair is generated from said first top field and said intervening bottom field and (ii) a second frame of said pair is generated from said intervening bottom field and said second top field,
(B) a single frame when said pair of repeated fields comprises a first bottom field repeated as a second bottom field separated by an intervening top field, wherein said single frame is generated from said intervening top field and said first bottom field, and
(C) a single frame when a top field and an adjacent bottom field are not repeated fields, wherein said single frame is generated from said top field and said adjacent bottom field.

13. The apparatus according to claim 12, wherein each of said frames is generated based upon a top field and a bottom field from the same film frame.

14. The apparatus according to claim 12, wherein said second top field in said pair of repeated fields is a third field of a film frame and said intervening bottom field is a second field of said film frame.

15. The apparatus according to claim 12, wherein said intervening top field is a second field of a film frame and said second bottom field is a third field of said film frame.

16. The apparatus according to claim 12, wherein said second circuit is further configured to generate said pair of frames by generating a repeated frame.

17. The apparatus according to claim 16, wherein said pair of frames comprise progressive pictures generated from a single film frame.

18. The apparatus according to claim 16, wherein said second circuit is further configured to generate said repeated frame from the same film frame as the other frame of said pair of frames.

19. The apparatus according to claim 16, wherein said repeated frame is generated from a second field of a film frame and a third field of said film frame.

20. The apparatus according to claim 16, wherein said repeated frame is added to a compressed bit stream by encoding said first frame of said pair of frames twice.

21. The apparatus according to claim 16, wherein said repeated frame is added to a compressed bit stream using a compressed representation that copies said first frame of said pair of frames.

22. The apparatus according to claim 16, wherein said repeated frame is identified as a repeat of said first frame of said pair of frames.

23. A method of encoding video, comprising the steps of:
(A) detecting a film pattern in an interlaced video sequence; and
(B) de-interlacing and decimating said video sequence by weaving top and bottom fields from a single film frame together, wherein when said film pattern comprises a pair of repeated top fields separated by an intervening bottom field, a pair of repeated frames is generated from the single film frame.

24. The method according to claim 23, wherein said video sequence comprises a Comite' Consultatif International des Radio Communications (CCIR) sequence and said frames comprise Common Intermediate Format (CIF) frames.

25. The method according to claim 23, wherein syntax elements of an elementary bit stream unrelated to repeated frames are used to signal repeated frames.

26. A video encoder comprising:
a first circuit configured to detect a film pattern in an interlaced video sequence; and
a second circuit configured to de-interlace and decimate said video sequence by weaving top and bottom fields from a single film frame together, wherein when said film pattern comprises a pair of repeated top fields separated by an intervening bottom field, a pair of repeated frames is generated from the single film frame.

27. A method for decoding a video sequence having repeated frames, comprising the steps of:
(A) detecting a pair of repeated frames in said video sequence;
(B) converting a first frame of said pair of repeated frames to a video sequence comprising a first top field, a bottom field and a second top field, wherein said second top field is a repeat of said first top field;
(C) converting a third frame immediately following said pair of repeated frames to a video sequence comprising a second bottom field and a third top field;
(D) converting a fourth frame immediately following said third frame to a video secruence comprising a third bottom field, a fourth top field and a fourth bottom field, wherein said third and said fourth bottom fields comprise repeated fields; and
(E) converting a fifth frame immediately following said fourth frame to a video seguence comprising a fifth top frame and a fifth bottom frame.

28. The method according to claim 27, further comprising: displaying said video sequence with repeated fields by displaying each frame as a number of fields, wherein said number depends on a position of a current frame relative to at least one of the repeated frames.

29. The method according to claim 27, wherein the step (A) further comprises:
detecting said repeated frames in said video sequence in response to information tunneled in an encoded bit stream carrying said video sequence.

30. The method according to claim 27, wherein the step (A) further comprises:
detecting said repeated frames in said video sequence in response to detection of dummy picture encoding.

31. The method according to claim 27, wherein the step (A) further comprises:
detecting said repeated frames in said video sequence in response to a comparison between decoded pixels.

32. A video decoder comprising:
a first circuit configured to detect a pair of repeated frames in a video sequence; and
a second circuit configured to convert said video sequence with said pair of repeated frames to a video sequence with repeated fields, wherein (i) a first frame of said pair of repeated frames is converted to a video sequence comprising a first top field, a bottom field and a second top field, wherein said second top field is a repeat of said first top field, (ii) a third frame immediately following said pair of repeated frames is converted to a video sequence comprising a second bottom field and a third top field, a fourth frame immediately following said third frame is converted to a video sequence comprising a third bottom field, (iii) a fourth top field and a fourth bottom field, wherein said third and said fourth bottom fields comprise repeated fields and (iv) a fifth frame immediately following said fourth frame is converted to a video seauence comprising a fifth top frame and a fifth bottom frame.

33. The video decoder according to claim 32, wherein said first circuit is further configured to:
detect said repeated frames in said video sequence in response to information tunneled in an encoded bit stream carrying said video sequence.

34. The video decoder according to claim 32, wherein said first circuit is further configured to:
detect said repeated frames in said video sequence in response to detection of dummy picture encoding.

35. The video decoder according to claim 32, wherein said first circuit is further configured to:
detect said repeated frames in said video sequence in response to a comparison between decoded pixels.

* * * * *